Dec. 1, 1931.  F. M. ROEHL  1,834,182
TURNOVER MECHANISM FOR DOUGHNUT MACHINES
Filed May 31, 1929   4 Sheets-Sheet 1

Inventor
Frank M. Roehl
By Caswell & Sagaard
Attorneys

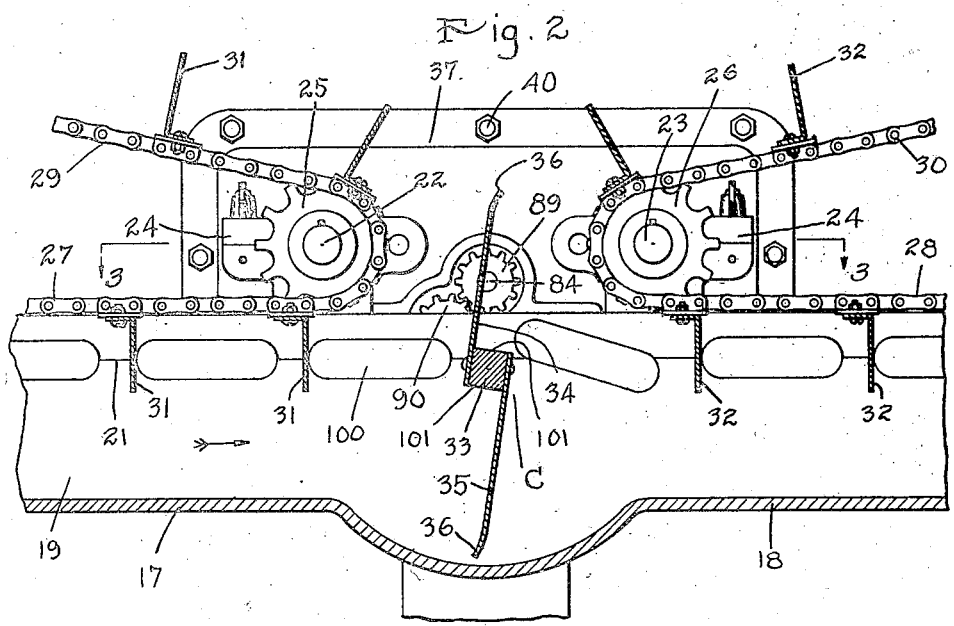
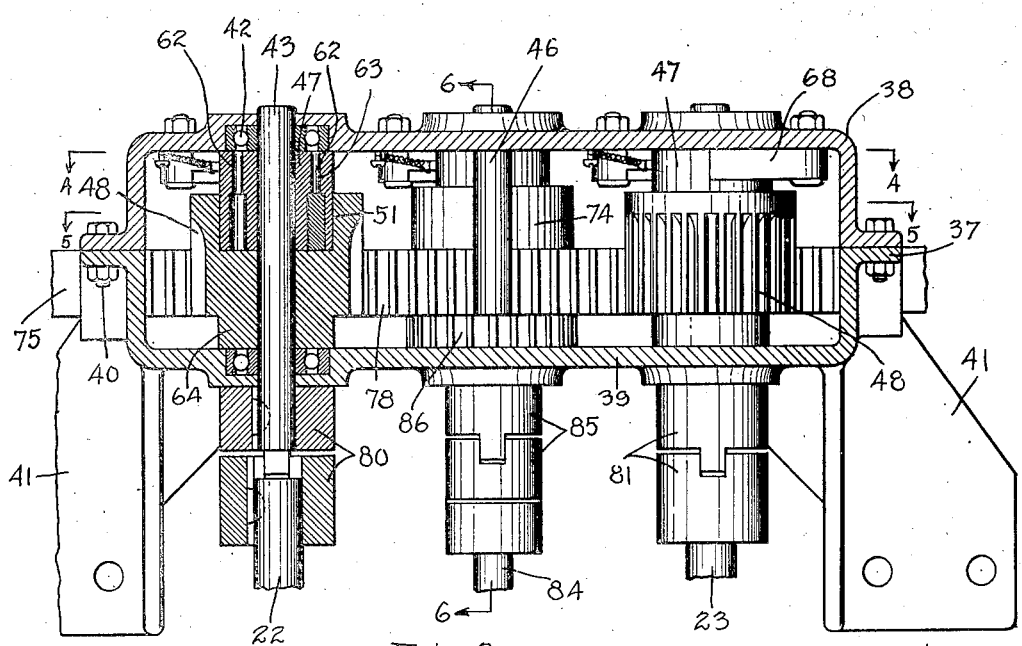

Dec. 1, 1931.  F. M. ROEHL  1,834,182
TURNOVER MECHANISM FOR DOUGHNUT MACHINES
Filed May 31, 1929   4 Sheets-Sheet 3

Inventor
Frank M. Roehl
By Caswell & Lagaard
Attorneys

Dec. 1, 1931.  F. M. ROEHL  1,834,182
TURNOVER MECHANISM FOR DOUGHNUT MACHINES
Filed May 31, 1929  4 Sheets-Sheet 4

Inventor
Frank M. Roehl
By Caswell & Sagaard
Attorneys

Patented Dec. 1, 1931

1,834,182

UNITED STATES PATENT OFFICE

FRANK M. ROEHL, OF MINNEAPOLIS, MINNESOTA, ASSIGNOR TO NATIONAL AUTOMATIC DOUGHNUT MACHINE COMPANY, OF MINNEAPOLIS, MINNESOTA, A CORPORATION OF MINNESOTA

TURNOVER MECHANISM FOR DOUGHNUT MACHINES

Application filed May 31, 1929. Serial No. 367,240.

My invention relates to doughnut machines and particularly to devices for turning over the doughnuts and conveying the same along the machine, and has for its object to provide a machine which is positive in action and which will operate continuously without interruption.

Another object of the invention resides in utilizing a doughnut machine including a tank for the reception of a cooking liquid and a pair of conveyors terminating intermediate the ends of said tank and in proximity to one another for moving the doughnuts along the tank.

A still further object of the invention resides in disposing the turn-over device between the ends of said conveyors whereby the doughnuts discharged from the one conveyor are turned over and delivered to the other conveyor.

Another object of the invention resides in providing means for simultaneously and intermittently driving said conveyors, and for intermittently driving said turn-over device, and for further operating said conveyors and turn-over device alternately.

A feature of the invention resides in providing a frame and in journalling therein three shafts, and in mounting concentrically relative to said shafts rotatable driving members.

An object of the invention resides in forming said revoluble members with pinions, and in providing a reciprocable rack adapted to alternately rotate said pinions in opposite directions.

Another object of the invention resides in providing ratchets and pawls between said revoluble members and shafts for driving said shafts upon the reciprocation of the rack in certain directions.

A still further object of the invention resides in providing ratchets and pawls between said shafts and frame for locking said shafts from movement upon reciprocation of said rack in certain directions.

An object of the invention resides in driving said conveyors and turn-over device from said ratchet driven shafts.

A feature of the invention resides in providing a shaft for the operation of said turnover device and in disposing said shaft below the level of the liquid within said tank, and in extending the drive for said shaft upwardly through said tank so as to eliminate the extension of the bearing for said shaft through said tank.

An object of the invention resides in attaching to the side of the tank a case having a shaft journalled therein above the level of the liquid within said tank and driven from one of said ratchet operated shafts and in providing a bearing within said case below the level of the liquid for journalling said turn-over shaft, and in further providing driving means within said case for driving said turn-over shaft from said upper shaft.

Other objects of the invention reside in the details of construction thereof, and in the novel combination and arrangement of parts hereinafter illustrated or described.

In the drawings:

Fig. 2 is a longitudinal sectional view taken on line 2—2 of Fig. 1 and drawn to a larger scale.

Fig. 3 is a plan sectional view of the driving mechanism of the invention taken on line 3—3 of Fig. 2.

Figure 1:
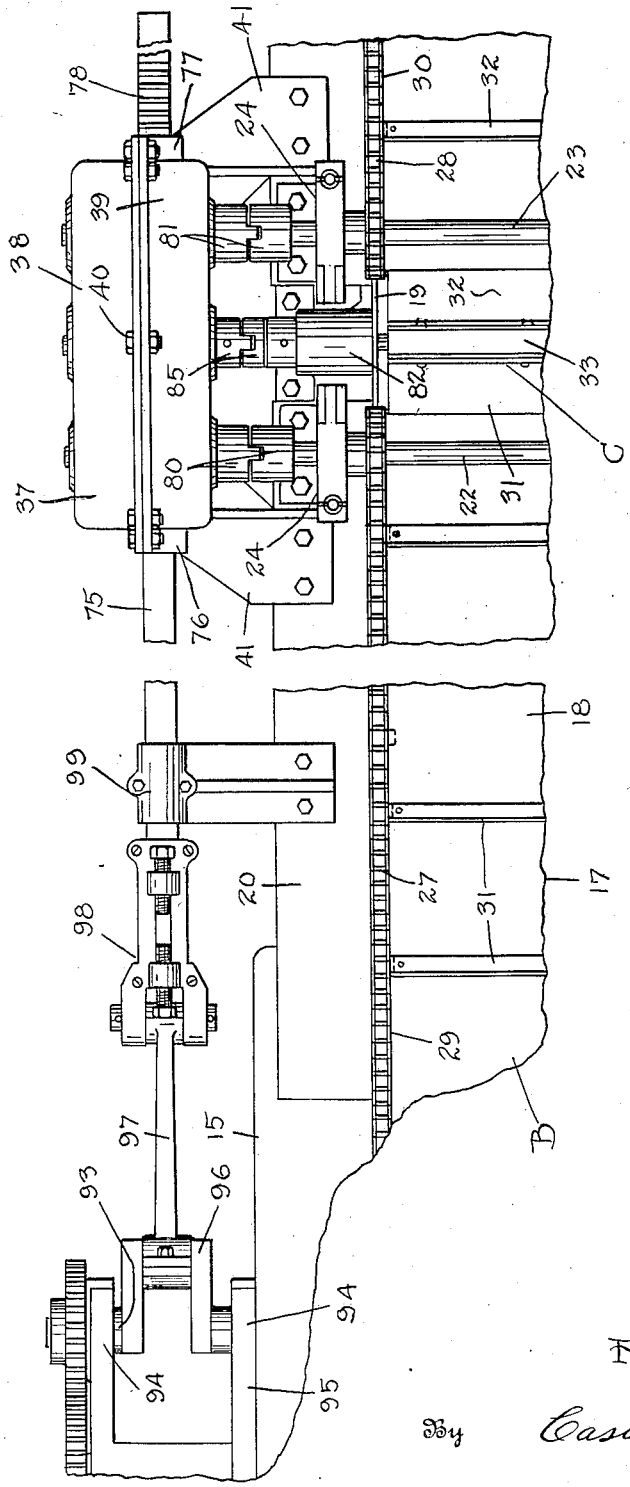
Fig. 1 is a plan view of a portion of a doughnut machine illustrating an embodiment of my invention.

The instant invention relates to a device for turning over the doughnuts for use on doughnut machines, such as is shown in the copending application of myself and Peter J. Toews, Serial Number 316,144, filed October 31, 1928, for doughnut machines. Such construction being described in detail in this application will only be briefly referred to here. This machine comprises primarily a frying device indicated at B, together with a device for forming the raw doughnuts into the desired form, any of a number of which devices may be used for this purpose, such device not being illustrated in the drawings. The frying device includes, furthermore, a tank 17 for the reception of hot grease, means for conveying the doughnuts along the tank, including two conveyors 29 and 30, and a device for turning over the doughnuts which I have indicated in its entirety at C.

The tank 17 is preferably elongated and is provided with a bottom 18, side walls 19 and end walls not shown. This tank is supported upon a frame work 15 including a pair of longitudinal angle beams 20 which are secured to the sides 19 and which are carried by suitable legs or other supporting structures. The tank 17 is partially filled with grease or some other cooking fluid to a level indicated at 21, and may be maintained in a liquid state through suitable gas burners or other heating means, such as disclosed in the above mentioned application for Letters Patent.

Intermediate the ends of the tank 17 are disposed two transverse shafts 22 and 23 which are journalled in suitable bearings 24 attached to the angle beams 20. These shafts carry sprocket wheels 25 and 26 which have chains 27 and 28 mounted thereon extending toward the front and the rear of the tank 17 where the same are similarly supported to form the conveyors 29 and 30 previously referred to. Chains 27 and 28 have attached to them by means of suitable attachment links, transverse paddles 31 and 32 which extend outwardly from the surfaces of the said chains. Conveyors 29 and 30 are so disposed as to cause the lower runs thereof to follow along the upper edge of the sides 19 of tank 17 so that the paddles 31 and 32 of said conveyors dip down into the cooking fluid and operate to move the doughnuts 17 along the tank.

As will be noted in Figs. 1 and 2, the shafts 22 and 23 are spaced from one another to form an intervening space between the two conveyors 29 and 30. Within this space is disposed the turn-over device which serves to pick up the doughnuts discharged from the conveyor 29, turn the same over and deliver them to the conveyor 30. This device comprises primarily a square shaft 33 which is journalled in a manner to be presently described below the upper portion of the tank and which has attached to it two oppositely extending plates 34 and 35. These plates are preferably perforated to permit of the free movement of the same through the cooking fluid as will presently become apparent. When the conveyors 29 and 30 are driven to cause the movement of the doughnuts in the direction shown by the arrow in Fig. 2, the shaft 33 is given a clockwise rotation, as viewed in Fig. 2, to cause the plates 34 and 35 to alternately engage the doughnuts and turn the same over. For facilitating the engagement of the doughnuts, the extreme ends of the two plates 34 and 35 are bent to form ridges indicated at 36, which cause the positive turn-over of the doughnut. In the instant invention, the two conveyors 29 and 30 are simultaneously driven in the same direction intermittently to give the doughnuts a step by step movement. During the cessation of movement of these conveyors, the turn-over device C is moved through an angle of 180° to pick up the doughnuts from the conveyor 29, turning the same over and discharging the doughnuts to the conveyor 30. The construction for securing the relative movement of the parts will now be described in detail.

Figure 5:
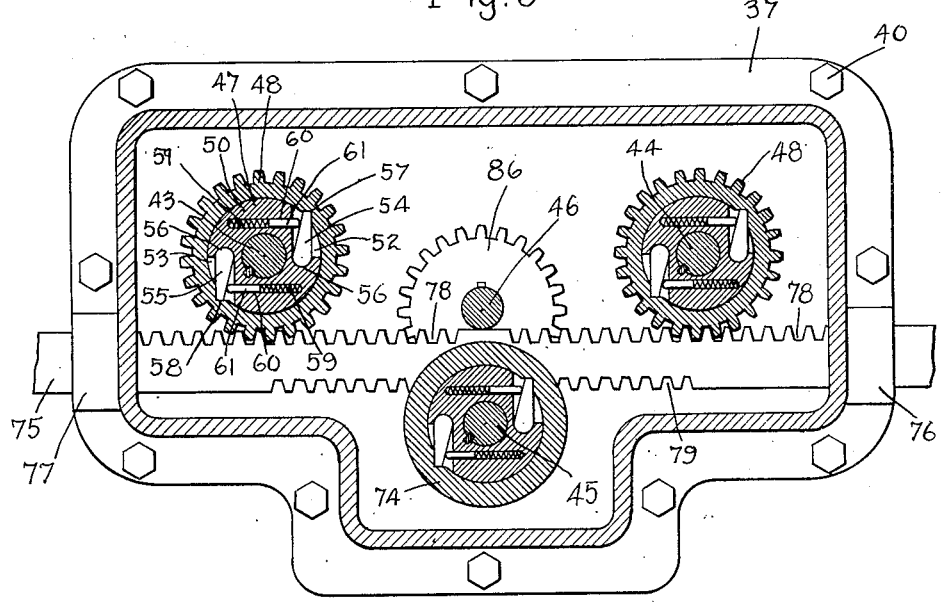
Fig. 5 is a view similar to Fig. 4 taken on line 5—5 of Fig. 3.

Attached to the angle beams 20 is a transmission case indicated in its entirety at 37. This case comprises two halves 38 and 39 which are bolted together through bolts 40 and which are supported on the said angle beam through brackets 41 formed on the portion 39 of the case proper. Case 37 is provided with a number of bearings 42 which journal four transverse shafts 43, 44, 45 and 46 extending completely through the said case and serving to drive the two conveyors 29 and 30 and the turn-over device C, as will be presently described. The two shafts 43 and 44 are positioned at the upper portion of the case while the shaft 45 is positioned somewhat below the said shafts 43 and 44. Each of the shafts 43 and 44 has mounted upon it a pawl supporting member 47 and a spur pinion 48 positioned in proximity thereto. This construction being identical for both shafts, only that associated with the shaft 43 will be described in detail. The member 47 is fast upon shaft 43 while the pinion 48 is freely rotatable thereon. Member 47 comprises a hub 50 which is set into a socket of internal bore 51 formed in one end of the spur pinion 48. The hub 50 is recessed on opposite sides thereof, as indicated at 52 and 53 to receive two pawls 54 and 55 which are pivoted for rocking movement in sockets 56 formed in the said hub. If desired, the pawls 54 and 55 may be further supported for rotatable movement by means of shanks 62 formed thereon, best shown in Fig. 3, which are received in bearings 63 formed in the members 47 adjacent the hub portions 50 thereof. These pawls are adapted to engage notches 57 and 58 formed on the inner periphery of the bore 51 of spur pinion 48 and serve to effect a drive between the shaft 43 and pinion 48 when the pinion 48 rotates in a counterclockwise direction, as shown in Fig. 5. Notches 57 and 58 are constructed to permit of the withdrawal of the pawls 54 and 55 therefrom when the said pinion 48 is rotated in a clockwise direction viewed from the same figure. For forcing the pawls into the notches 57 and 58, two coil springs 59 are employed which are received within drilled openings 60 and which bear against plungers 71 slidable along the said openings and engaging the upper portions of the said pawls. The said pawls are held from removal from the members 47 through engagement with the inner surface of the pinion 48 which is held from movement along the shaft 43 by means of a hub 64 which extends up to the bearing 42 at the end of said shaft adjacent the said pinion.

Figure 4:
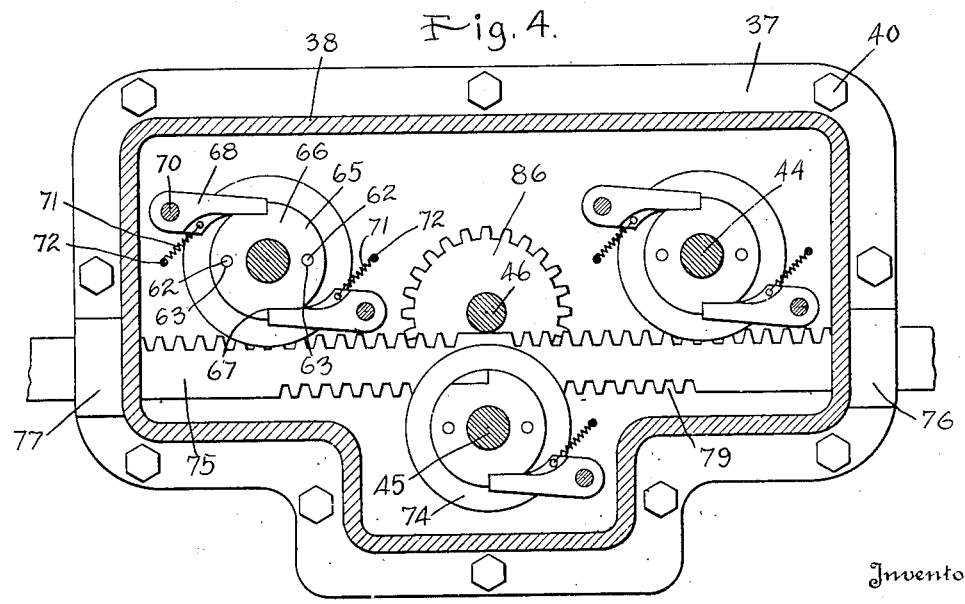
Fig. 4 is an elevational sectional view taken on line 4—4 of Fig. 3.

In conjunction with the pawl supporting member 47, a locking device is employed which is best illustrated in Fig. 4. The exposed portion of the said member, which I have indicated at 65 in Fig. 4, is formed with two notches 66 and 67 similar to the notches 57 and 58 except that the same are formed at the exterior of this portion of the said member. These notches are adapted to be engaged by two pawls 68 and 69 which are pivoted to the portion 38 of case 37 by means of two pins 70. Tension coil springs 71, secured to the said pawls and to pins 72 fast on the said case, serve to hold the pawls normally in engagement with the surface of the said revoluble member and prevent the rotation of the said revoluble member in a counter-clockwise direction as viewed in Fig. 4. By means of this construction, it will be readily noted that the pinion 48 may rotate in either direction and that rotation of the same in a clockwise direction turns the member 47 and the shaft 43 to which it is attached with it, while rotation of said pinion in the opposite direction causes the said gear to idle with respect to the shaft 43, the same being held from rotation during such movement by the pawls 48 and 49.

As before stated, shaft 44 is also provided with a pawl and ratchet acutating mechanism and a locking mechanism identical with that employed with shaft 43. Similarly, the shaft 45 is constructed with a ratchet and pawl device for driving the same and a locking mechanism identical with that used for shafts 43 and 44 except that a smaller spur pinion, which I have designated at 73, is employed, which is positioned to one side of the member 74 which corresponds with the pinion 48 of the other shafts of the invention. By means of this construction, the shaft 45 may be operated exactly the same as the shafts 43 and 44.

In conjunction with the gears 48 and 73, I employ a rack bar 75 which is mounted for reciprocable movement in two guides 76 and 77 formed in the case 37. This rack bar is constructed with rack teeth 78 on the upper surface thereof, which mesh with the two spur pinions 48 of shafts 43 and 44 and is further constructed with rack teeth 79 on the lower surface thereof which mesh with the spur pinion 73 on shaft 45. As the rack bar 75 is reciprocated, all of the spur pinions 73 and 48 are simultaneously rotated the same being rotated in alternate direction as the said rack bar is given a back and forth movement. With this construction, an intermittent movement is simultaneously given to shafts 43 and 44 and a corresponding intermittent movement given to shaft 45. Due to the fact that said shafts are driven from different racks, namely on opposite sides of the said spur pinions, shaft 45 remains stationary while shafts 43 and 44 are rotated, and shafts 43 and 44 remain stationary while shaft 45 is rotated giving these shafts alternate movement. It is also to be noted that spur pinion 73 being smaller, the shaft 45 is rotated through a greater angle than either of the shafts 43 or 44 for a purpose to be presently described.

The shafts 43 and 44 project beyond the portion 39 of the case 37 and have attached to them couplings 80 and 81, which are also attached to the shafts 22 and 23, whereby the conveyors 29 and 30 may be driven upon the rotation of the said shafts. Inasmuch as both of the spur pinions 48 mesh with the same rack, both conveyors 29 and 30 are driven in the same direction and given a step by step movement as the rack 75 is reciprocated. The length of travel of the rack 75 is such as to cause each of the conveyors 29 and 30 to travel a distance equal to the distance between the paddles 21 and 22 thereof so as to advance the doughnuts step by step a distance sufficient to permit of the engagement thereof by the turn-over device and the delivery to the following conveyor.

Figure 6:
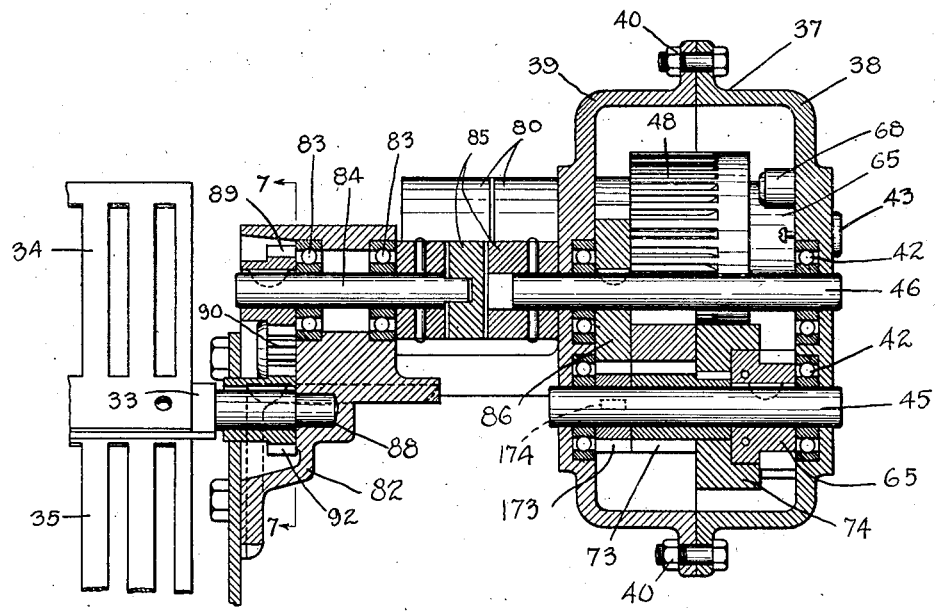
Fig. 6 is a cross sectional view taken on line 6—6 of Fig. 3.
Figure 7:
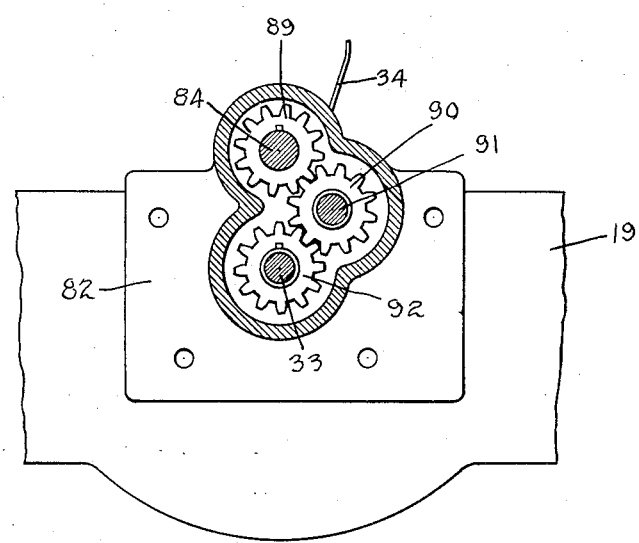
Fig. 7 is a vertical sectional view taken on line 7—7 of Fig. 6.

The turn-over device C is supported and driven as best shown in Fig. 6. To the side 19 of the tank 17 and to the longitudinal angle beam 20 is attached a gear case 82 which is directly bolted to the said side 19 to form a liquid-tight joint. This gear case provides in the upper portion thereof bearings 83 for the journalling of a short shaft 84 disposed in axial alignment with the shaft 46 in case 37 and connected thereto by means of a coupling 85. The shaft 46 is driven from the spur pinion 73 on shaft 45 through a spur gear 86 which is rigidly secured to said shaft and serves to impart to the shaft 84 an intermittent movement similar to the movement of the shafts 22 and 23. At the lower end of the case 82 is formed an inwardly extending bearing closed at its outer end, which I have indicated at 88, which extends through the wall of tank 17 and which forms a support for one end of the shaft 33 of turn-over device C. The other end of said shaft is supported in like manner. By means of this construction, cooking fluid is prevented from leaking through the bearings and escaping from the tank, thereby greatly economizing upon the amount of cooking fluid used in the frying of the doughnuts. The shaft 84 has keyed to it a spur gear 89 which meshes with an idler spur gear 90 rotatably mounted on a stud shaft 91 secured to the gear case 82. This idler pinion in turn meshes with a gear 92 fast on the shaft 33 on which the turn-over plates 34 and 35 are attached. With this construction, the shaft 33 is given an intermittent clock-wise rotation as viewed from Fig. 2, when the rack bar 75 is reciprocated. It is further to be noted that the gear ratio of the gears 86 and spur pinion 73 are such as to give the shaft 33 a rotation of 180° for the movement of the conveyors 29 and 30 a distance equal to that between successive paddles thereon.

For reciprocating the rack 75, a crank shaft 93 is employed which is journalled in bearings 94 formed in a frame structure 95 attached to the supporting structure of the machine proper. This shaft is provided with a crank 96 which has connected to it a connecting rod 97 pivotally attached to an adjustable connection 98 secured to the end of the rack bar 75. The rack bar 75 may be slidably guided in addition to guides in case 37 by means of other guides 99 situated along the machine which are attached to the angle beam 20 in line with the guides 76 and 77 previously referred to. As the shaft 93 is rotated, the connecting rod 97 is caused to reciprocate the said rack bar and to actuate the conveyor and turn-over device.

The conveyor 29 is so timed that when the same stops, one of the paddles thereof is positioned immediately in advance of the shaft 33 a distance equal to the space between successive paddles. This delivers the doughnut in close proximity to the turn-over device C where the same may be picked up and turned over. The turn-over device C is timed so that the same comes to rest in a position such that the plates 34 and 35 have passed their vertical position. When the turn-over device is actuated from the position shown in Fig. 2, the plate 35 is swung beneath the last doughnut which I have designated at 100, picks up and lifts the same out of the liquid and inverts it, causing the doughnut to drop back into the cooking liquid on the opposite side of the shaft 33 in inverted position. During the elevation of the doughnut, the flat sides 101 of the shaft 45 serve to form a temporary support for the doughnut and also as a pivot for causing the doughnut to turn over in leaving the device. The conveyor 30 is timed in exactly the same manner as the conveyor 29, so that the doughnut falls between the shaft 33 and the paddle 32 which is spaced from the said shaft a distance equal to the distance between paddles. After the turning over of the doughnut has been completed, the turn-over device remains stationary while the two conveyors 29 and 30 are brought into action to advance another doughnut in a position to be turned over and to remove the previously turned doughnut from the turn-over device so as to leave a space for the reception of the following doughnut. While in this position, the various paddles 31 and 32 of the conveyors 29 and 30 readily clear the upstanding plate of the turn-over device C, which in Fig. 2 is the plate 34, so as not to interfere with the operation of the device. When the two conveyors 29 and 30 come to rest, the paddles 31 and 32 are so disposed as to permit of the rotation of the plates 34 and 35 without interference therewith.

The advantages of my invention are manifest. An extremely simple and effective device is provided in which the doughnuts are positively moved and turned over, thereby preventing the spoiling of the doughnuts and increasing the efficiency of the machine. The turning over of the doughnuts may be performed very rapidly so as not to waste time in the operation of the machine and to procure a maximum output. The transmission for driving the various conveyors and the turn-over device may be readily removed from the supporting structure without dismantling the entire machine. Most of the operating parts, including a portion of the transmission, may be enclosed with an inclosed case and operated in the bath of oil so as to reduce the wear and friction in conjunction therewith.

Changes in the specific form of my invention, as herein disclosed, may be made within the scope of what is claimed without departing from the spirit of my invention.

Having described my invention, what I claim as new and desire to protect by Letters Patent is:

1. A doughnut machine comprising a tank for the reception of a cooking liquid, a conveyor for moving doughnuts along said tank, a device for turning over the doughnuts, a reciprocable member, means driven by said member upon one stroke thereof, for operating said conveyor, means driven by said member on the other stroke thereof for operating said turn-over device.

2. A doughnut machine comprising a tank for the reception of a cooking liquid, a conveyor for moving doughnuts along said tank, a device for turning over the doughnuts, a reciprocable member, means driven by said member upon one stroke thereof for operating said conveyor, means driven by said member on the other stroke thereof for operating said turn-over device, and means for locking each of said operating means upon actuation of the other by said member.

3. A doughnut machine comprising a tank for the reception of a cooking liquid, a conveyor situated at one end of said tank and terminating intermediate the ends thereof, a second conveyor situated at the other end of said tank and terminating in proximity to said first conveyor, a turn-over device positioned between said conveyors, means for intermittently moving said conveyors jointly, and means for operating the said turn-over device during the cessation of movement of said conveyor.

4. A doughnut machine comprising a tank for the reception of a cooking liquid, a pair of conveyors disposed within said tank and terminating intermediate the ends thereof adjacent one another, a turn-over device positioned between said conveyors, a frame, three shafts journalled in said frame, means for driving said conveyors and turn-over device from said shafts, revoluble members concentrically disposed with relation to said shafts, means for simultaneously rotating and revoluble members alternately in opposite directions, and means for driving said shafts from said revoluble members during the rotation thereof in one direction.

5. A doughnut machine comprising a tank for the reception of a cooking liquid, a pair of conveyors disposed within said tank and terminating intermediate the ends thereof adjacent one another, a turn-over device positioned between said conveyors, a frame, three shafts journalled in said frame, means for driving said conveyors and turn-over device from said shafts, revoluble members concentrically disposed with relation to said shafts, means for simultaneously rotating said revoluble members alternately in opposite directions, means for driving said shafts from said revoluble members during the rotation thereof in certain directions, and means for locking said shafts from movement throughout the rotation of said members in their opposite directions.

6. A doughnut machine comprising a tank for the reception of a cooking liquid, a pair of conveyors disposed within said tank and terminating intermediate the ends thereof adjacent one another, a turn-over device positioned between said conveyors, a frame, three shafts journalled in said frame, means for driving said conveyors and turn-over device from said shafts, revoluble members concentrically disposed with relation to said shafts, pawls and ratchets operating between said revoluble members and shafts for driving said shafts upon rotation of said revoluble members in certain directions, and ratchets and pawls operating between said frame and shafts for holding said shafts from rotation upon rotation of said revoluble members in the opposite direction.

7. A doughnut machine comprising a tank for the reception of a cooking liquid, a pair of conveyors disposed within said tank and terminating intermediate the ends thereof adjacent one another, a turn-over device positioned between said conveyors, a frame, three shafts journalled in said frame, means for driving said conveyors and turn-over device from said shafts, revoluble members concentrically disposed with relation to said shafts, pinions connected with said revoluble members, a reciprocable rack for alternately rotating said pinions and revoluble members in opposite directions, and means for driving said shafts from said revoluble members during the rotation thereof in certain directions.

8. A doughnut machine comprising a tank for the reception of a cooking liquid, a pair of conveyors disposed within said tank and terminating intermediate the ends thereof adjacent one another, a turn-over device positioned between said conveyors, a frame, three shafts journalled in said frame, means for driving said conveyors and turn-over device from said shafts, revoluble members concentrically disposed with relation to said shafts, pinions connected with said revoluble members, a rack having teeth on opposite sides thereof, two of said pinions meshing with the rack teeth on one side of said rack and the other of said pinions meshing with the rack teeth on the other side of said rack, means for driving said shafts from said revoluble members during the rotation thereof in certain directions, means for driving said conveyors from said first two shafts, and means for driving said turn-over device from said latter shaft.

9. A doughnut machine comprising a tank for the reception of a cooking liquid, a pair of conveyors disposed within said tank and having paddles thereon for moving the doughnuts along said tank, said conveyors terminating adjacent one another intermediate the ends of said tank, a shaft extending across said tank between said conveyors, plates on said shaft for turning over the doughnuts leaving one of said conveyors, and discharging them to the second conveyor, means for simultaneously and intermittently moving said conveyors distances equal to the spacing between said paddles, and means for rotating said turn-over shaft a fractional part of a turn equal to the number of plates thereon during the period of cessation of movement of said conveyors.

10. A doughnut machine comprising a tank for the reception of a cooking liquid, a pair of conveyors disposed within said tank and having paddles thereon for moving the doughnuts along said tank, said conveyors terminating adjacent one another intermediate the ends of said tank, a shaft extending across said tank between said conveyors, plates on said shaft for turning over the doughnuts leaving one of said conveyors, and discharging them to the second conveyor, a frame, three shafts journalled in said frame, revoluble members concentrically disposed relative to said shafts, said revoluble members having pinions connected thereto, a reciprocating rack for simultaneously rotating said pinions alternately in opposite directions, means for driving said shafts from said revoluble members during the rotation thereof in certain directions, means for driving said conveyors from two of said shafts, said rack having a movement sufficient to move said conveyors the distance between the blades thereof, and gearing for driving said paddle shaft from said third shaft, said gearing being proportioned to cause the paddle to rotate a fraction of a turn equal to the number of plates thereon during the movement of said conveyors a distance equal to the distance between the blades thereof.

11. A doughnut machine comprising a tank for the reception of a cooking liquid, conveying means for moving the doughnuts along said tank, a case attached to said tank on one side thereof, a driven shaft mounted in said case above the level of the liquid within said tank, a bearing within said case extending inwardly into said tank and below the level of the liquid therein, a shaft journalled in said bearing, a turn-over device actuated by said shaft, and drive means extending between said shafts and confined within said case for driving said turn-over shaft from said driven shaft.

12. A doughnut machine comprising a tank for the reception of a cooking liquid, a pair of conveyors disposed within said tank and having paddles thereon for moving the doughnuts along said tank, said conveyors terminating adjacent one another intermediate the ends of said tank, a shaft extending across said tank between said conveyors, plates on said shaft on opposite sides thereof and extending in opposite directions for turning over the doughnuts leaving the paddles of one of said conveyors, said shaft serving as a support for the edge of the doughnut during the turning over thereof.

13. A doughnut machine comprising a frame, a tank for the reception of a cooking liquid, means for shifting the position of doughnuts in said tank relative to said frame, a device carried by said frame for turning over the doughnuts, a movable member movable in two directions, means operated by said member during its movement in one direction for actuating said turnover device, and means operable by said member while moving in the other direction for actuating said means for shifting the position of the doughnuts.

14. A doughnut machine comprising a frame, a tank for the reception of a cooking liquid, means for shifting the position of doughnuts in said tank relative to said frame, a device carried by said frame for turning over the doughnuts, a reciprocable member, means driven by said member upon one stroke thereof for operating said means for shifting the position of the doughnuts, and means driven by said member on the other stroke thereof for operating said turn over device.

15. A doughnut machine comprising a frame, a tank for the reception of a cooking liquid, means for shifting the position of doughnuts in said tank relative to said frame, a device carried by said frame for turning over the doughnuts, a reciprocable member, means driven by said member upon one stroke thereof for operating said means for shifting the position of the doughnuts, means driven by said member on the other stroke thereof for operating said turn over device, and means for locking each of said operating means upon actuation of the other by said member.

16. A doughnut machine comprising a tank for the reception of a cooking liquid, a conveyor for moving doughnuts along said tank including a shaft, a paddle wheel at the end of said conveyor for turning over the doughnuts, and means for alternately giving said conveyor shaft and paddle wheel partial turns to advance the doughnuts along the tank and to turn over the doughnuts in the tank.

17. A doughnut machine comprising a tank for the reception of a cooking liquid, a conveyor at one end of said tank, a conveyor at the other end of said tank, a turn over device disposed between the delivery end of one of said conveyors and the receiving end of the other of the conveyors, and means for jointly moving said conveyors periodically in alternation with a corresponding periodic movement of said turn over device.

In testimony whereof I have affixed my signature to this specification.

FRANK M. ROEHL.